United States Patent
Ambekar Ramachandra Rao et al.

(10) Patent No.: US 11,320,367 B1
(45) Date of Patent: May 3, 2022

(54) SYSTEM AND METHOD FOR FAR-FIELD OPTICAL TESTING OF HEAT-ASSISTED RECORDING HEADS

(71) Applicant: Seagate Technology LLC, Fremont, CA (US)

(72) Inventors: Raghu Ambekar Ramachandra Rao, Bloomington, MN (US); Aaron Edward Patz, Bloomington, MN (US); Tae-Woo Lee, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 49 days.

(21) Appl. No.: 17/066,562

(22) Filed: Oct. 9, 2020

(51) Int. Cl.
| | |
|---|---|
| *G01N 21/21* | (2006.01) |
| *G01N 21/39* | (2006.01) |
| *G11B 5/455* | (2006.01) |
| *G11B 5/00* | (2006.01) |

(52) U.S. Cl.
CPC ............ *G01N 21/21* (2013.01); *G01N 21/39* (2013.01); *G11B 5/455* (2013.01); *G01N 2201/06113* (2013.01); *G11B 2005/0021* (2013.01)

(58) Field of Classification Search
CPC .............. G01N 21/21; G01N 21/39; G01N 2201/06113; G11B 5/455; G11B 2005/0021; G11B 5/105; G11B 5/4866; G11B 11/10539; G11B 13/045
USPC .......................................................... 356/73
See application file for complete search history.

(56) References Cited

U.S. PATENT DOCUMENTS

| | | | |
|---|---|---|---|
| 7,583,386 B2 | 9/2009 | Freischlad et al. | |
| 8,278,917 B2* | 10/2012 | Nakagomi | G11B 5/455 324/210 |
| 8,787,132 B2* | 7/2014 | Saito | G11B 5/314 369/53.1 |
| 9,202,487 B2* | 12/2015 | Peng | G11B 5/105 |
| 9,711,172 B1* | 7/2017 | Teguri | G11B 5/59627 |
| 9,779,769 B2 | 10/2017 | Heidmann | |
| 9,905,253 B1* | 2/2018 | Lee | G11B 5/314 |
| 2012/0307605 A1* | 12/2012 | Zhang | G11B 5/455 369/13.32 |
| 2014/0307533 A1* | 10/2014 | Peng | G11B 13/045 369/13.29 |
| 2017/0200460 A1* | 7/2017 | Teguri | G11B 5/59627 |

FOREIGN PATENT DOCUMENTS

| | | | | |
|---|---|---|---|---|
| JP | 2015053100 A | * | 3/2015 | ............ G11B 5/4866 |
| JP | 6063892 B2 | * | 1/2017 | ............ G11B 5/4866 |

* cited by examiner

*Primary Examiner* — Roy M Punnoose
(74) *Attorney, Agent, or Firm* — Mueting Raasch Group

(57) ABSTRACT

A testing system includes a production-type laser having optical modes of a production laser that interfaces with an optical path of a heat-assisted magnetic recording (HAMR) slider. A far-field light illumination path delivers excitation light from the production-type laser to the optical path of the HAMR slider, the excitation light being emitted from an air bearing surface (ABS) of the HAMR slider. Optics receive the emitted light from the ABS and distribute the emitted light to one or more sensors. The system determines, based on signals received from the one or more sensors, a depolarization of the emitted light and a coupling efficiency of the HAMR slider. The system may also measure light reflecting out of the optical path and Fourier transform these measurements to determine locations of reflections within the optical path.

20 Claims, 6 Drawing Sheets

SYSTEM AND METHOD FOR FAR-FIELD OPTICAL TESTING OF HEAT-ASSISTED RECORDING HEADS

SUMMARY

Embodiments described herein include a system and method for far-field optical testing of heat-assisted recording heads. In one embodiment, methods and systems use a production-type laser having optical modes of a production laser that interfaces with an optical path of a heat-assisted magnetic recording (HAMR) slider. A far-field light illumination path delivers excitation light from the production-type laser to the optical path of the HAMR slider. The excitation light is emitted from an air bearing surface (ABS) of the HAMR slider. Collection optics receive the emitted light from the ABS and distribute the emitted light to one or more sensors. A processor is coupled to the production-type laser and the one or more sensors. The processor is configured to determine, based on signals received from the one or more sensors, a depolarization of the emitted light and a coupling efficiency of the HAMR slider.

In another embodiment, methods and systems use a light source that emits light at a plurality of wavelengths over a spectral range. A far-field light illumination path delivers the light to an optical path of a heat-assisted magnetic recording (HAMR) slider, causing reflected light to be emitted from the HAMR slider towards the far field illumination path. A detector receives the reflected light via the far-field light illumination path and produces a signal in response thereto. A processor is coupled to the light source and the detector, and is operable to: determine a spectra of the reflected light based on the signal from the detector; perform a Fourier transform on the spectra of the reflected light to produce a reflection spectra; and determine locations of reflections within the optical path based on the reflection spectra.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
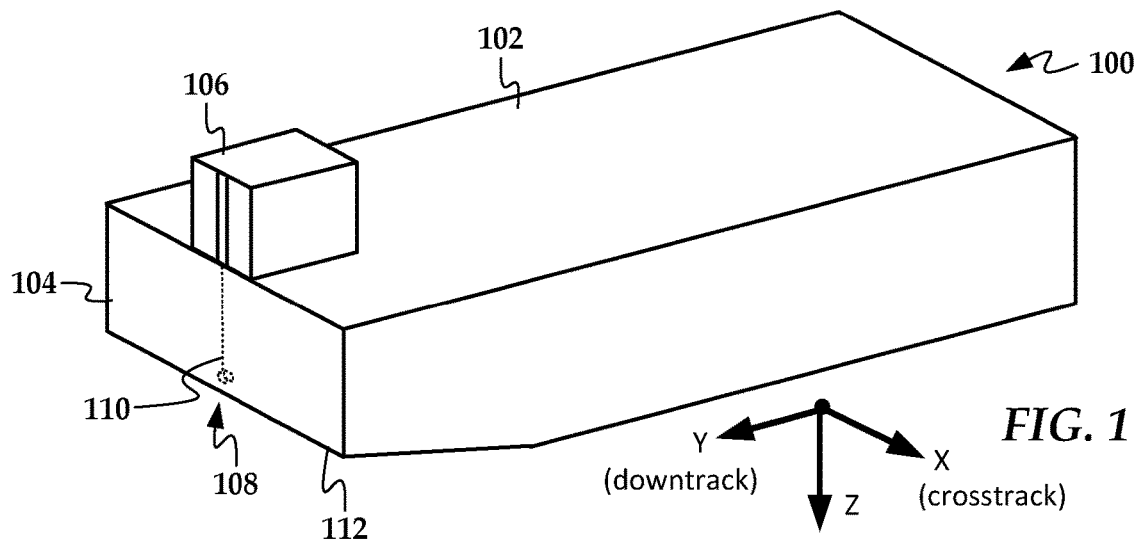
FIG. 1 is a perspective view of a slider assembly according to an example embodiment.

The present disclosure generally relates to metrology of heads for data storage devices that utilize a magnetic recording medium, e.g., magnetic disks. For example, a hard disk drive (HDD) unit contains one or more magnetic disks that are written to and read from using a magnetic read/write head attached to the end of an arm that is positioned over tracks in the disk. To record data, the read/write head generates magnetic fields using a magnetic coil, the fields being directed to the magnetic disk surface via a write pole. To read data, the read/write head senses changes in magnetic field via a sensor such as a magneto-resistive stack that is held proximate to the moving disk. A disk drive typically has multiple heads, one for each disk surface.

In order to increase areal density capacity (ADC) in magnetic storage, some drives utilize a technology known as heat-assisted magnetic recording (HAMR). In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

Figure 2:
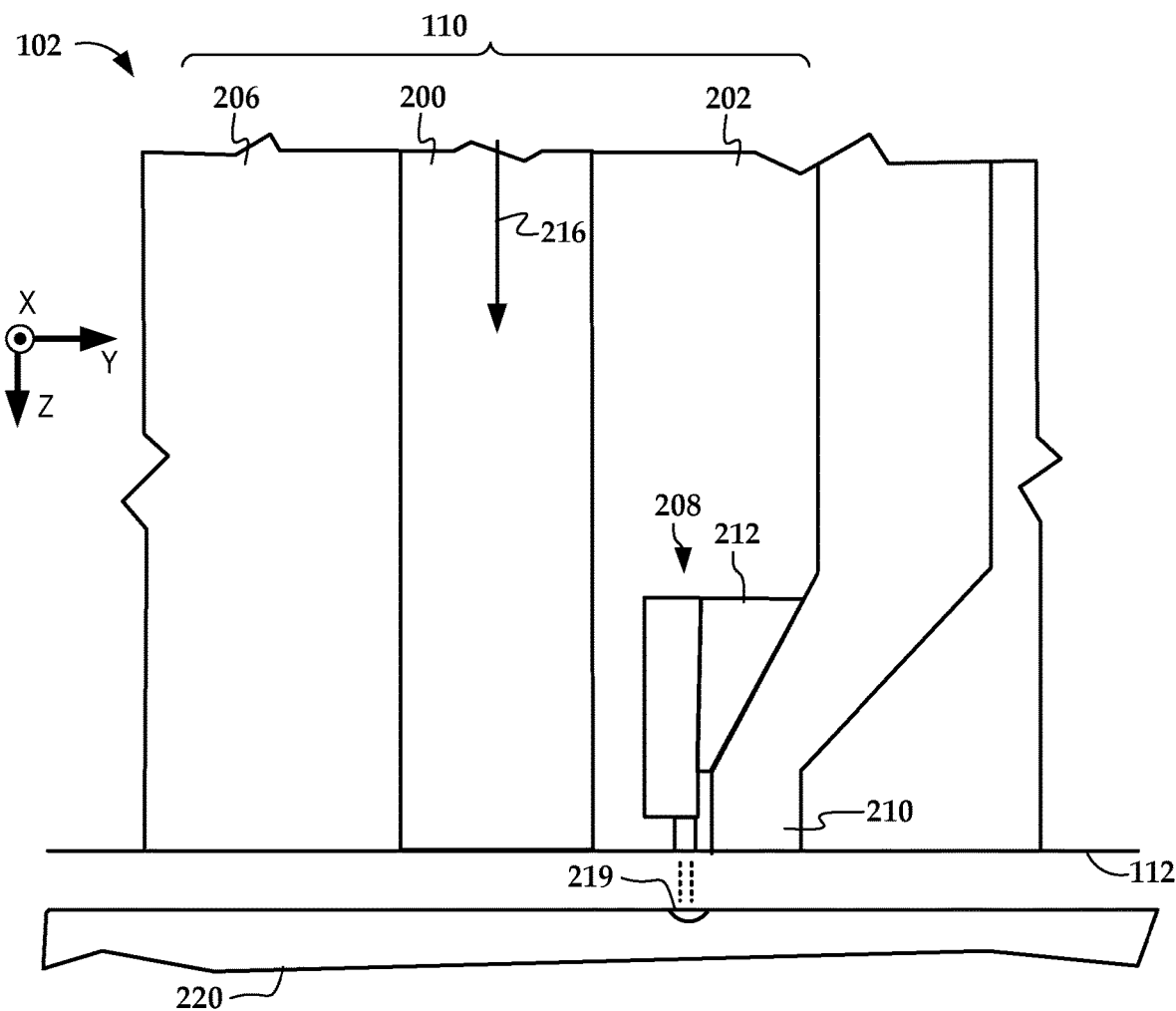
FIG. 2 is a perspective view of a laser diode according to an example embodiment.

In FIG. 2, a cross-sectional view shows details of a slider body 102 according to an example embodiment. The waveguide 110 includes a core 200, top cladding layer 202 and bottom cladding 206. Other cladding layers not shown in this figure may be used with this waveguide 110, such as middle and side cladding. The core 200 delivers light to an NFT 208 that is located at the media-facing surface 112. A write pole 210 (also referred to herein as a "magnetic pole") is located near the NFT 208. A heat sink 212 thermally couples the NFT 208 to the write pole 210. A magnetic coil (not shown) induces a magnetic field through the write pole 210 in response to an applied current. During recording, the waveguide 110 delivers light 216 from a light source to the NFT 208. The NFT 208 directs surface plasmons out of the media-facing surface 112 to form a hotspot 219 within a recording layer of a moving recording medium 220. The write pole 210 sets a magnetic orientation in the hotspot 219, thereby writing data to the recording medium 220.

The optical components shown in FIGS. 1 and 2 are nanometer-scale features formed of various materials, including metals and dielectrics. Manufacturing defects can significantly impact optical efficiency of the slider, such that the optical components of some sliders will be unable to perform adequately. Most of the electrical and components of a large number of sliders are formed integrally on a wafer, being built up on the wafer using layer deposition processes. After layer deposition, the wafers can be separated (e.g., diced) into bars, each bar containing a row of slider body portions as described above. The bars are then further divided into individual heads.

In order to continually improve slider design and manufacturing processes, it is desirable determine performance of the slider optics (as well as viability of other slider components) during different stages in the manufacturing process, e.g., prototyping, small-scale production, large-scale production. These measurements, referred to herein as metrology, can be on bars of sliders, or on the individual sliders. These measurements can be used, for example, to help track how closely the manufactured devices perform relative to the predicted performance, monitor quality of the manufacturing processes, etc. It is preferable to test a large number of sliders in order to gather meaningful statistics.

In previous metrology setups, an operational laser (e.g., a laser of the type that will be installed on the slider at a later manufacturing stage) was butt-coupled to the test sliders for metrology of the sliders. While this can provide accurate results because the laser modes are the same as those expected during slider operation, there were reliability issues. For example, the contact between the laser and the slider resulted in damage to the laser, requiring downtime to remedy. Also, it can be difficult to align the laser and slider in such an arrangement, which can significantly reduce the units per hour that are processed by the system.

In the present disclosure, a system, apparatus, and method are described that uses far-field optics to perform metrology on HAMR heads. The concepts describe herein may apply to the metrology of any micro-optical device (e.g., waveguide, couplers, transducers, etc.), however some features may be particularly useful in HAMR applications. The metrology system described below allows for optical characterization of HAMR heads by providing data/metrics such as far-field coupling efficiency (measure of light path health, which affects laser current required to heat the media), depolarization (measure of waveguide to NFT coupling, which also affects laser current), overall reflection and reflection as a function of distance and wavelength (measure of laser instability,), group index (measure of light path health). The metrology system can also locate defects in the light path nondestructively. The test system can provide these results quickly and accurately, allowing the characterization of large numbers of sliders in a short amount of time.

Figure 3:
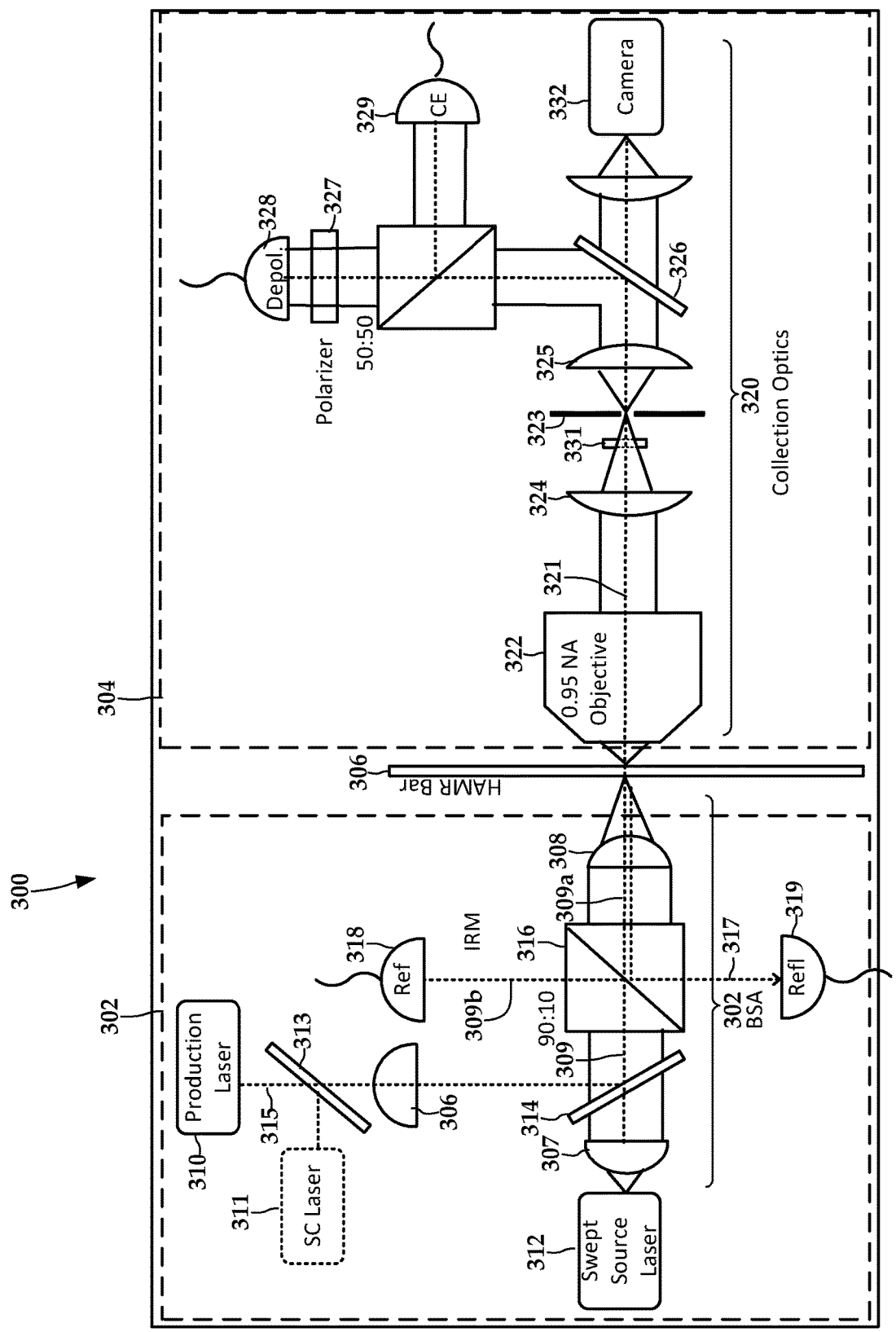
FIG. 3 is a schematic diagram of a metrology system according to an example embodiment.

In FIG. 3, a schematic diagram shows a testing system 300 according to an example embodiment. The system 300 is generally divided into two sections. A first section 302 includes a far field illumination path with illumination sources and focusing optics that direct light to an input of a HAMR slider, here shown as a bar 306 of HAMR sliders. The sliders 306 may be configured similar to the slider 100 in FIG. 1, but without the laser diode assembly 106 installed. A second section 304 includes transmission optics and detectors that make measurements from light emitted through the HAMR sliders 306, e.g., via an ABS of each slider 306. Note that the first section 302 also includes some detecting devices and optics, e.g., for measuring reflection in the slider.

The first section 302 includes a beam shaping assembly (BSA), which is an optical imaging module that enables far-field characterization through 1:1 relay imaging (as opposed to butt-coupled laser) with special aspheric lenses 307, 308 while preserving the optical mode profile of a production-type laser 310. The production-type laser 310 emits excitation light 315 in optical modes that are designed to interface with the optical path of the HAMR slider per the original design of the HAMR laser/slider assembly, e.g., the laser diode assembly 106 of FIG. 1. The production-type laser 310 may have similar optical features as the production laser 106, e.g., dimensions of the active region and surrounding cladding, same materials, similar response to input currents, etc. However the packaging of the laser 310 could be different than that of the production laser 106. By using the production laser 310, an accurate measure of real-world performance of the HAMR slider can be obtained.

The production laser 310, as well as other optional lasers 311, 312, provide light 309 for various testing modes. Mirrors 313, 314 direct light from the lasers 310-312 to a beam splitting mirror 316. Most of light from the mirror 316 is directed out to lens 308 in a beam 309a that is focused onto and through the HAMR sliders 306. Transmitted light 321 is gathered by collection optics 320 after passing through each the sliders 306 one at a time. A small amount of the direct light 309b is diverted via mirror 316 to a reference detector 318. Reflected light 317 from the HAMR sliders 306 is directed via the mirror 316 to a reflection detector 319. These two detectors 318, 319 can be used for characterization of slider light path reflections as will be described in greater detail below. These detectors 318, 319 can also be used to measure group index of the slider optical path.

The collection optics 320 include an objective lens 322 with a numerical aperture (NA) slightly less than one, in this case 0.95. The objective lens 322 gathers emitted light 321 that exits the ABS of the HAMR sliders 306. A set of lenses 324, 325 and an aperture plate 323 are used to reject uncoupled stray light which is passed to relay optics. The relay optics include a mirror 326 that divides the light between a camera 332 and detectors 328, 329. The camera 332 provides an image of the light pattern as it exits the ABS of the sliders 306. Depolarization detector 328 measures light that passes through a polarization filter 327. The polarization-filtered detector 328 measures how much of the light that passes through the slider optics is depolarized. A coupling efficiency (CE) detector 329 provides a measure of coupling efficiency or transmission efficiency. The signal from the CE detector 329 is compared with the signal from reference detector 318 to obtain the calculated value of CE.

The collection optics 320 can provide a number of functions during slider testing. For example, alignment of the sliders 306 with the BSA 302 can be ascertained by maximizing light detected while moving the sliders 306 with a mechanical actuator, e.g. moved in a plane perpendicular to the light beam 309a. Such an actuator can also move the sliders 306 in a direction parallel to the light beam 309 to ensure a focal point of the light beam 309a is on the light input surface of the slider. The detectors 328, 329 and camera 332 can all be activated during testing to provide the different metrology measurements noted above. The camera 332 can be used for pattern recognition for automation (e.g., automatic alignment of the slider) based on light emitted from the optical path of the slider. In some applications, e.g., to detect an ABS light pattern, the ABS can be illuminated by a white light source 331 that is here shown in the collection optics 320 light path, but can be injected anywhere in the path, e.g., by using a mirror similar to mirror 314. The illustrated arrangement of the BSA 302 solves issues of frequent burnouts of the production laser 310 and provides improvement to reliability of tester and high volume data collection.

As noted above, some reflection/collection optics are located in the first section 302 of the system. These collection optics, which include detectors 318, 319, are part of an interferometric reflectivity metrology (IRM) section. The IRM is an automated and fast test module for capable of identifying and measuring sources of reflection within HAMR slider nondestructively. Those sources of reflection include the NFT, internal reflection, and input coupler interface. This is useful in providing design feedback, e.g., to help mitigate laser instability. The IRM can also identify defects within light path nondestructively, which may indicate wafer processing issues.

The IRM testing setup is conceptually similar to optical coherence tomography used in eye clinics for retina imaging. Generally, the swept source laser 312 outputs light that varies through a predefined range of wavelengths over time as it illuminates the light path of the sliders 306. Some portion of the light is reflected back from the sliders 306 and recorded by the reflection detector 319. The reference detector 318 measures output (e.g., power) of the light emitted from the swept source laser 312 as a function of wavelength to normalize the measurements made from the reflection detector 319 to account for the laser's natural wavelength variation. The signals recorded by the reference detector 318 are recorded as a function of wavelength, and this signal is Fourier transformed to produce a reflection spectra (see FIG. 5), which can be converted to reflection as a function of distance.

In an alternate embodiment, the reflection spectra may be obtained with the supercontinuum laser 311. In this case, the detector 319 includes a spectrometer that directly provides the spectra from the broad bandwidth supercontinuum laser 311. Use of the supercontinuum laser 311 allows-all wavelengths within the specified range illuminated at once into the sliders 306. However, using the swept source laser 312 tends to result in lower noise in the detected signal, and which can make the spectra measurements simpler and more accurate. Even using the swept source laser 311, the detection of reflection sources is significantly faster than conventional techniques, e.g., point and measure. In one process, the IRM reduced the time per head to characterize slider reflections from 30 minutes to 0.7 s (>2000× improvement).

Figure 4:
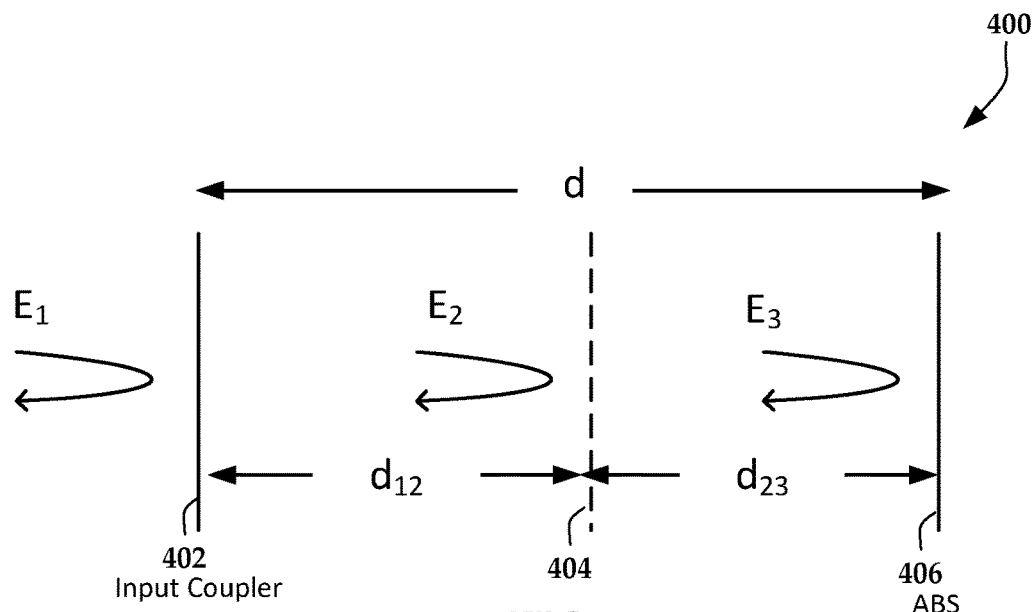
FIG. 4 is a diagram showing reflection sources in a slider according to an example embodiment.

In FIG. 4, a diagram shows examples of reflection sources within a HAMR slider 400 according to an example embodiment. Reflection $E_1$ may be caused by the and anti-reflective coating at the outer surface, the surface itself, input coupler 402, etc. Reflection $E_2$ is caused by components 404 between the input coupler and the ABS 406, and reflection $E_3$ is caused by the ABS 406. The component 404 may include any optical feature or component (e.g., unintended cladding material change step, waveguide defect, mode converter, NFT) and there may be more than one such component. The distance d is known, as this is a function of the slider geometry. One or both of the distances $d_{12}$, $d_{23}$ of the internal component 404 can be determined based on the reflection spectra relative to one or both of the input coupler 402 and ABS 406, which will also be visible in the reflection spectra plot.

Figure 5:
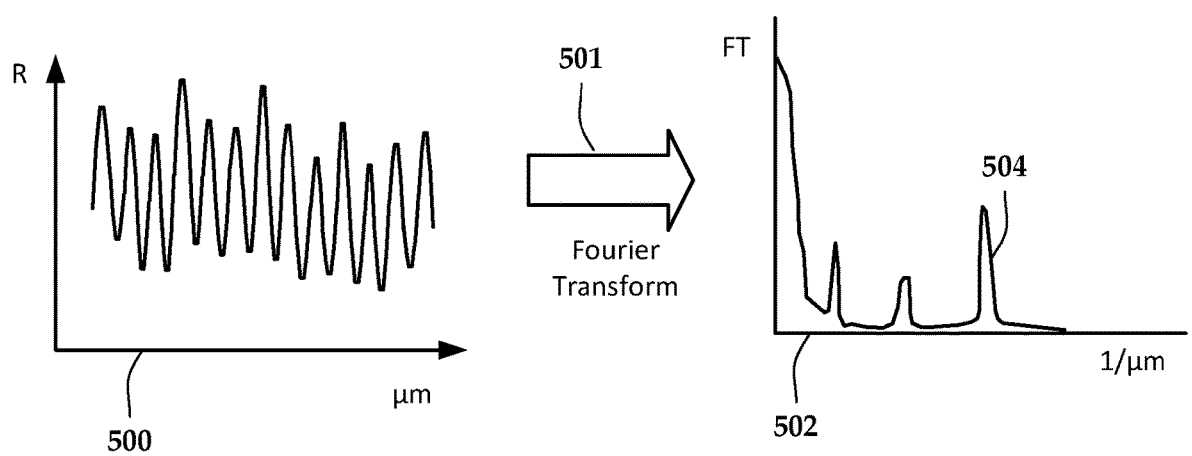
FIG. 5 is an example showing the determination of reflection spectra according to an example embodiment.

In FIG. 5, plots show spectra 500 obtained from wavelength sweep and a Fourier transform 501 of the spectra. The results 502 of the Fourier transform 501 are referred to herein as reflection spectra. The peaks of the plot 502 indicate regions of high reflection their location along the slider from the interface to NFT. This can be due to components formed in the light path as well as unwanted interfaces within the light path, e.g., due to manufacturing defects. The furthest peak 504 can be used to determine group index of the light path.

Figure 6:
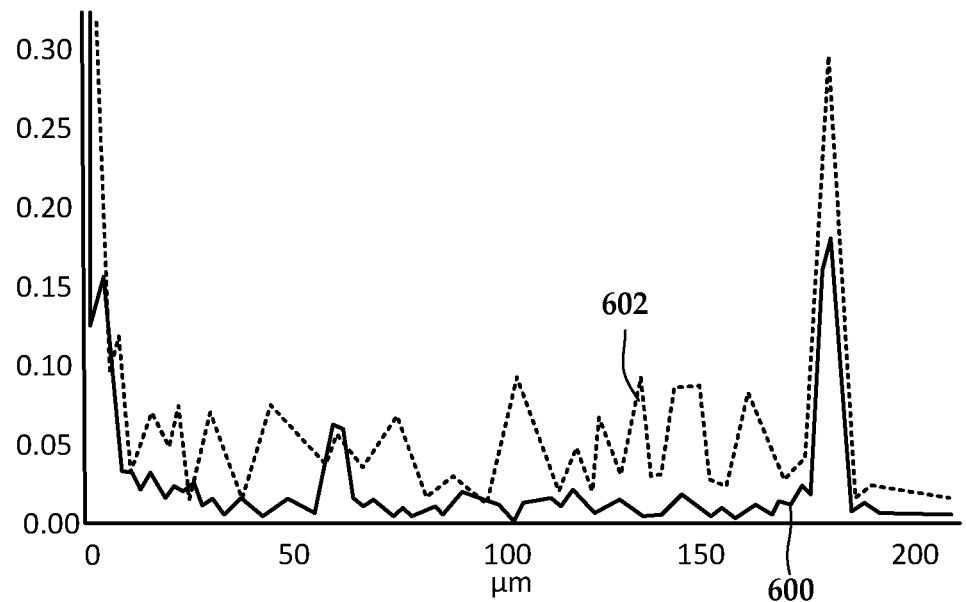
FIG. 6 is a graph showing results of reflection metrology performed on two different sliders according to an example embodiment.

In FIG. 6, a graph illustrates reflection spectra measured for first and second HAMR sliders using the IRM as described above. Trace 600 represents acceptable performance of the optical pathway of the first slider, and trace 602 represents a (likely)unacceptable performance of the optical pathway of the second slider. Note that both sliders show a peak near the ABS (e.g., around 175-185 µm), which corresponds to the region proximate the ABS. The change in index of refraction of the optical path/waveguide can also contribute to this peak, thus allowing the determination of group index.

Figure 7:
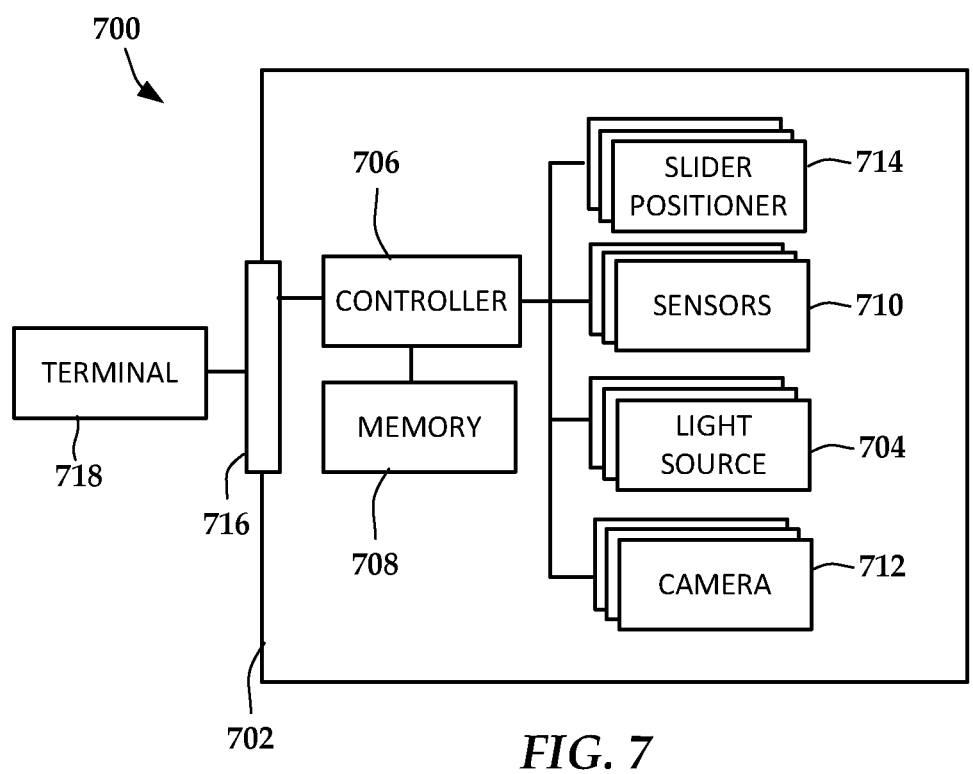
FIG. 7 is a block diagram showing functional components of a system according to an example embodiment.

In FIG. 7, a schematic diagram shows various functional components of a test system 700 according to an example embodiment. Generally, the test system 700 includes an enclosure 702 that houses optical and electronic components. The enclosure may provide other functions, such as isolating the optical and electronic components from external light, noise, dust, etc. Generally, the test system includes one or more light sources 704 that may include a production laser, swept laser, supercontinuum laser, etc., as shown in FIG. 3. The light source(s) 704 are coupled to a controller 706 that may include a central processing unit (CPU), chipset, system-on-a-chip, etc.

Generally the controller 706 may include any type of processors (e.g., CPUs, co-processors, digital signal processors, input-output busses) and as shown here is coupled to memory 708 that may include volatile and/or non-volatile memory. The memory 708 stores instructions that are executable via the controller 706 to perform various functions described herein. For example, the controller 706 can activate/deactivate the light sources 704 in synchronization with other operations performed in the test system. For a light source 704 that includes a swept laser, the controller can specify the wavelength range of the sweep, rate of wavelength change of the sweep, number of repetitions, etc.

One or more sensors 710 are coupled to the controller 706. These sensors may include the various detectors 318, 319, 328, 329 as shown in FIG. 3, as well as other sensors not shown, e.g., temperature sensors used for thermal compensation. The controller 706 uses the sensor(s) 710 in concert with the light source(s) 704. For example, the controller 706 may be operable to determine, based on signals received from the sensors 710, a depolarization of the emitted light, a coupling efficiency of the HAMR slider, a group index of the optical path of the HAMR slider, a spectra of the reflected light, etc. Also shown in the test system 700 are cameras 712, which may also be considered optical detectors, although are more often used for 2D or 3D imaging.

The controller 706 is also shown coupled to slider positioning actuators 714. The actuators 714 may include electrical motors and mechanical couplings that precisely position HAMR sliders in the far-field illumination path. The controller 706 may use a control loop to quickly position sliders, e.g., by maximizing optical power measured by one of sensors 710. Other electromechanical devices (not shown) may be coupled to the controller 706 as part of this positioning and other test management functions, e.g., limit switches, bar code readers, radio-frequency identification (RFID) readers, position sensors, etc.

The controller 706 is shown coupled to a data interface 716 that provides external access to the controller 706. The interface 716 may also provide access to data gathered by the controller 706, e.g., in a disk drive or flash memory module. In one example, the controller 706 may determine spectra of reflected light from the slider based on a signal from the detector, and this may be stored locally in the memory 708. A Fourier transform is performed on the spectra of the reflected light to produce a reflection spectra, and this may be done by the controller or an external computing device that accesses the stored data. The external computing device is shown here as terminal 718.

The terminal 718 is a computing device with user interface access, allowing local or remote control of the test system 700. For example, the terminal 718 may use an existing software package such as Labview® to perform data reduction, data manipulation (e.g., normalization of the spectra of the reflected light based on the power response measured via a reference detector, Fourier transform of the spectra of the reflected light, etc.), data storage, data presentation, etc. The terminal 718 may include displays, keyboards, mice, and the like allowing a user to access the raw and processed data, control the test system 700, etc.

Figure 8:
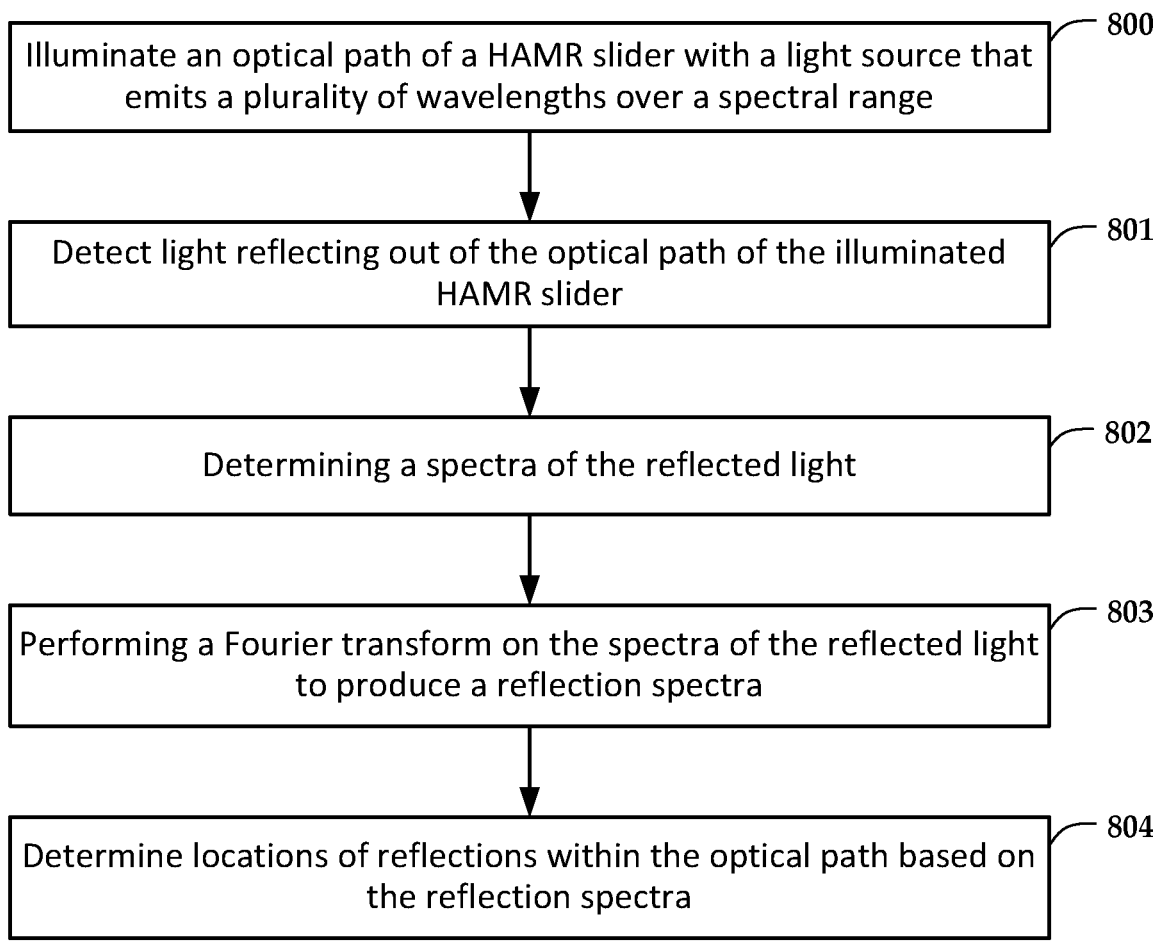
FIGS. 8 and 9 are flowcharts of method according to example embodiments.

In FIG. 8, a flowchart shows a method according to an example embodiment. The method involves illuminating 800 an optical path of a HAMR slider with a light source that emits a plurality of wavelengths over a spectral range. The light source may be a swept laser that transitions wavelength of emitted light over the spectral range. The light source may include a supercontinuum laser that emits the plurality of wavelengths simultaneously.

Light reflecting out of the optical path of the illuminated HAMR slider is detected 801, e.g., via a photodiode or the like for a swept laser light source. For a supercontinuum laser, the reflected light may be detected by a spectrometer. A spectra of the reflected light is determined 802 based on signals from the detector(s) and a Fourier transform is performed 803 on the spectra of the reflected light to produce a reflection spectra. Locations of reflections within the optical path are determined 804 based on the reflection spectra. The location and magnitude of these reflections may indicate defects, performance of optical devices in the light path, etc.

Figure 9:
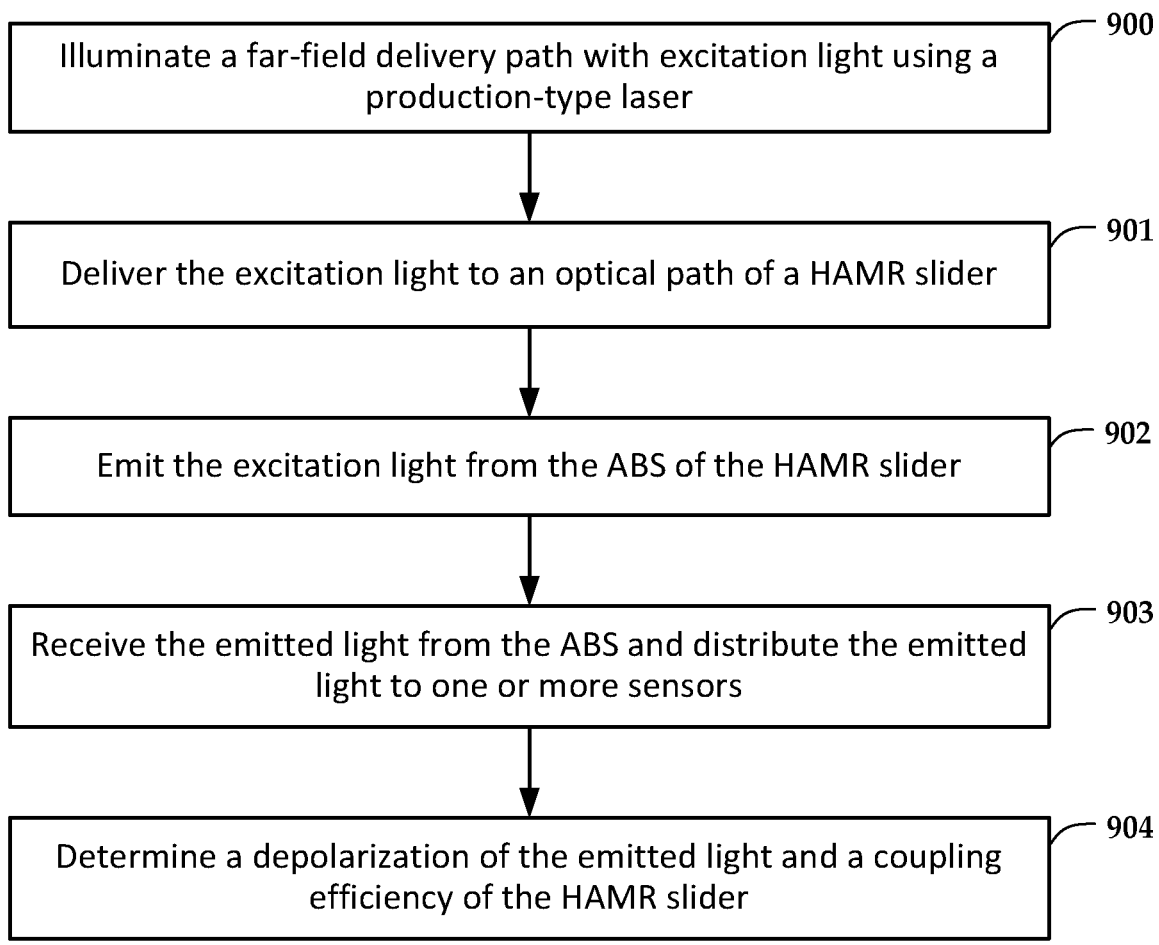

In FIG. 9, a flowchart shows a method according to another example embodiment. The method involves illuminating 900 a far-field transmission/illumination path with excitation light using a production-type laser having optical modes of a production laser that interfaces with a respective mounting surface and optical path of a HAMR slider. The far-field light illumination path delivers 901 excitation light from the production-type laser to the optical path of the HAMR slider. The excitation light is emitted 902 from an air bearing surface (ABS) of the HAMR slider. Collection optics receive 903 the emitted light from the ABS and distribute the emitted light to one or more sensors. Based on signals received from the one or more sensors, a depolarization of the emitted light and a coupling efficiency of the HAMR slider is determined 904.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A testing system, comprising:
    a production-type laser having optical modes of a production laser that interfaces with a mounting surface and an optical path of a heat-assisted magnetic recording (HAMR) slider;
    a far-field light illumination path that delivers excitation light from the production-type laser to the optical path of the HAMR slider, the excitation light being emitted from an air bearing surface (ABS) of the HAMR slider;
    collection optics that receive the emitted light from the ABS and distribute the emitted light to one or more sensors; and
    a processor coupled to the production-type laser and the one or more sensors, the processor configured to determine, based on signals received from the one or more sensors, a depolarization of the emitted light and a coupling efficiency of the HAMR slider.

2. The testing system of claim 1, further comprising a camera coupled to the collection optics, the camera configured to image the emitted light from the ABS of the slider.

3. The testing system of claim 1, wherein the one or more sensors comprise a polarization-filtered detector that measures the depolarization of the emitted light and a coupling efficiency detector that measures the coupling efficiency.

4. The testing system of claim 1, further comprising:
    a light source coupled to the far-field light illumination path that emits light at a plurality of wavelengths over a spectral range;
    a detector that receives reflected light caused by the light being delivered to the optical path of the HAMR slider, the detector producing a signal in response to the reflected light; and
    wherein the processor is coupled to the light source and the detector, the processor further configured to:
        determine a spectra of the reflected light based on the signal from the detector;
        perform a Fourier transform on the spectra of the reflected light to produce a reflection spectra; and
        determine locations of reflections within the optical path based on the reflection spectra.

5. The testing system of claim 4, wherein the light source comprises a swept laser that transitions wavelength of the light over the spectral range.

6. The testing system of claim 5, further comprising:
    measuring a power response of the swept laser via a reference detector; and
    equalizing the spectra of the reflected light based on the power response.

7. The testing system of claim 4, wherein the light source comprises a supercontinuum laser, and wherein the detector comprises a spectrometer.

8. The testing system of claim 4, wherein the processor is further configured to determine, based on the Fourier transform, a group index of the optical path of the HAMR slider.

9. A testing system, comprising:
- a light source that emits light at a plurality of wavelengths over a spectral range;
- a far-field light illumination path that delivers the light to an optical path of a heat-assisted magnetic recording (HAMR) slider, causing reflected light to be emitted from the HAMR slider towards the far field light illumination path;
- a detector that receives the reflected light via the far-field light illumination path and produces a signal in response thereto; and
- a processor coupled to the light source and the detector, the processor operable to:
  - determine a spectra of the reflected light based on the signal from the detector;
  - perform a Fourier transform on the spectra of the reflected light to produce a reflection spectra; and
  - determine locations of reflections within the optical path based on the reflection spectra.

10. The testing system of claim 9, wherein the light source comprises a swept laser that transitions wavelength of the light over the spectral range.

11. The testing system of claim 10, further comprising: measuring a power response of the swept laser via a reference detector; and
equalizing the spectra of the reflected light based on the power response.

12. The testing system of claim 9, wherein the light source comprises a supercontinuum laser, and wherein the detector comprises a spectrometer.

13. The testing system of claim 9, wherein the processor is further configured to determine, based on the Fourier transform, a group index of the optical path of the HAMR slider.

14. The testing system of claim 9, further comprising:
- a production-type laser coupled to the far-field light illumination path and having optical modes of a production laser that interfaces with the optical path of the HAMR slider, wherein the far-field light illumination path delivers excitation light from the production-type laser to the optical path of the HAMR slider, the excitation light being emitted from an air bearing surface (ABS) of the HAMR slider; and
- collection optics that receive the emitted light from the ABS and distribute the emitted light to one or more sensors, wherein the processor is coupled to the production-type laser and the one or more sensors and configured to determine, based on signals received from the one or more sensors, a depolarization of the emitted light and a coupling efficiency of the HAMR slider.

15. The testing system of claim 14, further comprising a camera coupled to the collection optics, the camera configured to image the emitted light from ABS of the slider.

16. The testing system of claim 14, wherein the one or more sensors comprise a polarization-filtered detector that measures the depolarization of the emitted light and a coupling efficiency detector that measures the coupling efficiency.

17. A method comprising:
- illuminating an optical path of a heat-assisted magnetic recording (HAMR) slider with a light source that emits a plurality of wavelengths over a spectral range;
- detecting light reflecting out of the optical path of the illuminated HAMR slider;
- determining a spectra of the reflected light;
- performing a Fourier transform on the spectra of the reflected light to produce a reflection spectra; and
- determining locations of reflections within the optical path based on the reflection spectra.

18. The method of claim 17, wherein the light source comprises a swept laser that transitions wavelength of the light over the spectral range.

19. The method of claim 18, further comprising:
measuring a power response of the swept laser via a reference detector; and
equalizing the spectra of the reflected light based on the power response.

20. The method of claim 17, further comprising determining a group index of the optical path of the HAMR slider based on the Fourier transform.

* * * * *